US006900259B2

(12) United States Patent
Klein et al.

(10) Patent No.: US 6,900,259 B2
(45) Date of Patent: *May 31, 2005

(54) REDISPERSIBLE DISPERSION POWDER COMPOSITION, ITS USE, AND PROCESS FOR ITS PREPARATION

(75) Inventors: Heinz-Peter Klein, Mainz (DE); Ulrich Geissler, Hochheim am Main (DE); Michael Schottler, Bischofsheim (DE); Ludwig Schmitz, Burstadt (DE)

(73) Assignee: Celanese Emulsions GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/647,011

(22) Filed: Aug. 22, 2003

(65) Prior Publication Data

US 2004/0048961 A1 Mar. 11, 2004

(30) Foreign Application Priority Data

Aug. 28, 2002 (DE) .......................................... 102 39 441

(51) Int. Cl.[7] .............................................. C08K 5/103
(52) U.S. Cl. ....................................... 524/315; 252/500
(58) Field of Search ........................... 524/315; 252/500

(56) References Cited

U.S. PATENT DOCUMENTS

| 4,734,135 A | * | 3/1988 | Satomi et al. | ......... | 106/287.23 |
| 5,606,015 A | * | 2/1997 | Chiou et al. | ................ | 528/495 |

FOREIGN PATENT DOCUMENTS

| DE | 1 248 292 | 11/1959 |
| DE | 100 49 127 A1 | 4/2002 |
| EP | 0 717 016 A1 | 6/1996 |
| EP | 0 731 128 A1 | 9/1996 |

* cited by examiner

*Primary Examiner*—William K. Cheung
(74) *Attorney, Agent, or Firm*—Muserlain, Lucas and Mercanti

(57) ABSTRACT

A dispersion powder composition based on water-insoluble polymers with particularly low water absorption comprises, based on the total weight of the polymer, an amount in the range from 0.1 to 30% by weight of at least one carboxylic ester whose acid component has at least 6 carbon atoms and whose alcohol component is a polyhydroxy compound, preferably glycerol, diglycerol, or triglycerol. This is prepared by mixing polymer and protective colloid with the carboxylic ester to prepare a dispersion and then, where appropriate, drying this with simultaneous admixing of an anticaking agent, and gives good results when used for modifying wallpaper pastes, mortars, or concrete.

19 Claims, No Drawings

REDISPERSIBLE DISPERSION POWDER COMPOSITION, ITS USE, AND PROCESS FOR ITS PREPARATION

The present invention relates to a water-redispersible dispersion powder composition based on water-insoluble polymers. The invention also relates to a process for preparing the composition, and to the use of the composition.

Water-redispersible dispersion powder compositions based on homo- and copolymers are known. Dispersion powder compositions of this type are prepared by spray drying the appropriate aqueous polymer dispersions in a hot stream of air. The dispersion powders are suitable additives for hydraulic binders in the construction materials industry. Products of this type are also used as binders in coating compositions or in adhesive compositions.

DE-A 100 49 127 describes water-redispersible dispersion powders based on a film-forming, water-insoluble polymer selected from the group consisting of the vinyl ester homo- and copolymers, vinyl ester-ethylene homo- and copolymers, vinyl chloride homo- and copolymers, (meth)acrylate homo- and copolymers, styrene-(meth)acrylate homo- and copolymers where these comprise, as hydrophobicizing agent, at least one carboxylic ester whose alcohol component derives from the group of the polyhydroxy compounds. Sorbitan laurate (sorbitan monolaurate) is mentioned in the examples as a particularly suitable hydrophobicizing agent from the group of the carboxylic esters mentioned in that specification. The dispersion powders are prepared by spray-drying of the aqueous mixtures derived from aqueous dispersions of the polymers mentioned, to which the hydrophobicizing agent has been added prior to spraying. However, despite hydrophobicization by the additive, the resultant dispersion powders retain relatively high water absorption and are therefore unsatisfactory.

An object on which the present invention was based was therefore to find novel hydrophobicizing agents which can be used to obtain a further reduction in the water absorption of water-redispersible dispersion powders based on film-forming, water-insoluble polymers.

Surprisingly, it has been found that carboxylic esters whose alcohol component derives from the group of the polyhydroxy compounds, in particular esters of glycerol, of diglycerol, or, respectively, of triglycerol with carboxylic acids having at least 6 carbon atoms, are suitable for preparing hydrophobic construction compositions which have markedly lower water absorption when compared with dispersion powders comprising sorbitan laurate as hydrophobicizing agent.

The present invention therefore provides a water-redispersible dispersion powder composition based on water-insoluble polymer of the general type mentioned at the outset, the characterizing feature of the composition being that it comprises, based on the total weight of the polymer, an amount in the range from 0.1 to 30% by weight of at least one carboxylic ester whose acid component has at least 6 carbon atoms and whose alcohol component is a polyhydroxy compound, preferably glycerol, diglycerol, or triglycerol.

Preference is given to a dispersion powder composition comprising a) at least one water-insoluble polymer selected from the group consisting of the vinyl ester homo- and copolymers, vinyl ester-ethylene homo- and copolymers, vinyl chloride homo- and copolymers, (meth)acrylate homo- and copolymers, styrene-(meth)acrylate homo- and copolymers;

b) from 3 to 35% by weight, preferably from 3 to 15% by weight, based on the total weight of the polymer, of a protective colloid;

c) from 0.1 to 30% by weight, preferably from 0.5 to 10% by weight, based on the total weight of the polymer, of at least one carboxylic ester whose acid component has at least 6 carbon atoms and whose alcohol component is glycerol, diglycerol, or triglycerol, and which has between 0 and 80 polyethylene oxide units between carboxylic acid component and alcohol component;

d) from 0 to 30% by weight, preferably from 1 to 20% by weight, based on the total weight of the polymer, of anticaking agents.

Suitable water-insoluble polymers are homo- and copolymers which take the form of an aqueous dispersion, or which can be converted into an aqueous dispersion, and which form a solid film, where appropriate at an elevated temperature, and/or in an alkaline medium, after drying and, where appropriate, curing. The average particle size of the powder is from 1 to 1 000 $\mu$m, preferably from 10 to 700 $\mu$m, particularly preferably from 50 to 500 $\mu$m.

Preferred water-insoluble polymers are:

vinyl ester homo- or copolymers containing one or more monomer units selected from the group consisting of the vinyl esters of unbranched or branched alkylcarboxylic acids having from 1 to 15 carbon atoms;

vinyl ester homo- or copolymers containing one or more monomer units selected from the group consisting of the vinyl esters of unbranched or branched alkylcarboxylic acids having from 1 to 15 carbon atoms and ethene;

vinyl ester homo- or copolymers containing one or more monomer units selected from the group consisting of the vinyl esters of unbranched or branched alkylcarboxylic acids having from 1 to 15 carbon atoms and (meth)acrylates;

vinyl ester homo- or copolymers containing one or more monomer units selected from the group consisting of the vinyl esters of unbranched or branched alkylcarboxylic acids having from 1 to 15 carbon atoms, (meth)acrylates and ethene;

(meth)acrylate homo- or copolymers containing one or more monomer units selected from the group consisting of the methacrylates and acrylates of unbranched or branched alcohols having from 1 to 12 carbon atoms;

(meth)acrylate homo- or copolymers containing one or more monomer units selected from the group consisting of the methacrylates and acrylates of unbranched or branched alcohols having from 1 to 12 carbon atoms and styrene;

homo- or copolymers of fumaric and/or maleic mono- or diesters of unbranched or branched alcohols having from 1 to 12 carbon atoms;

homo- or copolymers of dienes, e.g. butadiene or isoprene, or else of olefins, e.g. ethene or propene, where the dienes may be copolymerized with, for example, styrene, (meth)acrylates, or with the esters of fumaric or maleic acid;

homo- or copolymers of vinylaromatics, e.g. styrene, methylstyrene, or vinyltoluene;

homo- or copolymers of vinyl halogen compounds, e.g. vinyl chloride.

Water-insoluble, film-forming polyaddition or polycondensation polymers are likewise suitable, e.g. polyurethanes, polyesters, polyethers, polyamides, melamine-formaldehyde resins, and phenyl-formaldehyde resins, and, where appropriate, the oligomeric precursors of these.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having up to 15 carbon atoms, such as VeoVa9®, VeoVa10®, or VeoVa11® from Resolution, Netherlands. Particular preference is given to vinyl acetate and VeoVa10®.

Preferred methacrylates and acrylates are methyl acrylate, methyl methacrylate, ethyl acrylate, ethyl methacrylate, propyl acrylate, propyl methacrylate, n-butyl acrylate, tert-butyl acrylate, n-butyl methacrylate, tert-butyl methacrylate, and 2-ethylhexyl acrylate. Particular preference is given to methyl methacrylate, n-butyl acrylate, and 2-ethylhexyl acrylate.

Preferred ester groups of fumaric or maleic acid are methyl, ethyl, n-propyl, isopropyl, n-butyl, isobutyl, tert-butyl, hexyl, ethylhexyl, and dodecyl.

The vinyl ester copolymers may contain from 1.0 to 65% by weight, based on the total weight of the comonomer phase, of α-olefins, e.g. ethylene and propylene, and/or vinylaromatics, e.g. styrene, and/or vinyl halides, e.g. vinyl chloride, and/or acrylates of alcohols having from 1 to 12 carbon atoms, or methacrylates of these alcohols, e.g. methyl acrylate, methyl methacrylate, ethyl acrylate, ethyl methacrylate, propyl acrylate, propyl methacrylate, n-butyl acrylate, tert-butyl acrylate, n-butyl methacrylate, tert-butyl methacrylate or 2-ethylhexyl acrylate, and/or ethylenically unsaturated dicarboxylic acids and/or derivatives of these, e.g. diisopropyl fumarate, dimethyl, methyl tert-butyl, di-n-butyl, di-tert-butyl, or diethyl maleate and/or fumarate, or maleic anhydride.

The (meth)acrylate copolymers may contain from 1.0 to 65% by weight, based on the total weight of the monomers, of α-olefins, e.g. ethylene and propylene, and/or vinylaromatics, e.g. styrene, and/or vinyl halides, e.g. vinyl chloride, and/or ethylenically unsaturated dicarboxylic acids and/or derivatives of these, e.g. diisopropyl fumarate, dimethyl, methyl tert-butyl, di-n-butyl, di-tert-butyl, and diethyl maleate and/or fumarate, or maleic anhydride.

In another embodiment, the vinyl ester copolymers and (meth)acrylate copolymers contain from 0.05 to 10.0% by weight, based on the total weight of the comonomer mixture, of auxiliary monomers from the group consisting of the ethylenically unsaturated carboxylic acids, preferably acrylic acid or methacrylic acid, from the group consisting of the ethylenically unsaturated carboxamides, preferably acrylamide, from the group consisting of the ethylenically unsaturated sulfonic acids and salts of these, preferably vinylsulfonic acid or 2-acrylamido-2-methylpropanesulfonic acid (AMPS), and/or from the group consisting of the multiply ethylenically unsaturated comonomers, such as divinyl adipate, diallyl maleate, allyl methacrylate, or triallyl cyanurate. Other suitable auxiliary monomers are crosslinking comonomers, e.g. acrylamidoglycolic acid (AGA), methyl methacrylamidoglycolate (MAGME), N-methylolacrylamide (NMAA), N-methylolmethacrylamide, allyl N-methylolcarbamate, alkyl ethers, e.g. the isobutoxy ether, or esters of N-methylolacrylamide, of N-methylolmethacrylamide, or of allyl N-methylolcarbamate. The same applies to the copolymers of the maleic or fumaric esters.

The water-insoluble polymers mentioned are capable of free-radical polymerization and are preferably prepared by emulsion polymerization. The polymerization may be carried out batchwise or continuously, with or without the use of seed lattices, the initial charge comprising one or more, or all, of the constituents of the reaction mixture, or by the feed process with no initial charge. The rate of each feed preferably corresponds to the consumption of the respective component. The polymerization is preferably carried out in the temperature range from 0 to 100° C. and initiated by the methods usually used for emulsion polymerization. It is usually initiated by means of conventional water-soluble free-radical generators, preferably used in amounts of from 0.01 to 3.0% by weight, based on the total weight of the monomers. Any protective colloids and/or emulsifiers usually used in emulsion polymerization may be used as dispersing agents.

Where appropriate, up to 6% by weight of emulsifiers are used, based on the total weight of the monomers. The emulsifiers used here may be either anionic, cationic, or nonionic emulsifiers, as long as these are not soluble in the protective colloid.

It is preferable to use protective colloids, particularly preferably in amounts of up to 15% by weight, based on the total weight of the monomers. Examples of suitable protective colloids are polyvinyl alcohols and derivatives of these, such as vinyl alcohol-vinyl acetate copolymers, polyvinyl alcohol-ethene copolymers, polyvinylpyrrolidones, polysaccharides, e.g. starches (amylose and amylopectin), cellulose, guar, tragacantic acid, dextran, alginates and carboxymethyl, methyl, hydroxyethyl, or hydroxypropyl derivatives of these, proteins, e.g. casein, soya protein, gelatins, synthetic polymers, e.g. poly(meth)acrylic acid, poly(meth)acrylamide, polyvinylsulfonic acids, and water-soluble copolymers of these, melamine-formaldehydesulfonates, naphthalene-formaldehyde-sulfonates, styrene/maleic acid copolymers, and vinyl ether-maleic acid copolymers. In one particularly preferred embodiment, the polymerization is carried out using polyvinyl alcohol as protective colloid.

For the purposes of the present invention, polyhydroxy compounds are defined as any of the low-molecular-weight or macromolecular organic compounds whose molecule contains two or more hydroxyl groups (Römpp Lexikon Chemie [Römpp Encyclopedia of Chemistry]—Version 2.0, Stuttgart/New York: Georg Thieme Verlag 1999). The polyhydroxy compounds are also termed polyols and for the purposes of the present invention the definition includes polyhydric alcohols. Glycerol, diglycerol and triglycerol may be mentioned as a particularly preferred polyhydroxy component of the claimed carboxylic esters.

The acid components of the carboxylic esters of the invention contain at least 6 carbon atoms and may be either saturated or unsaturated, and branched or unbranched. The acid radical may also contain halogens, such as fluorine or chlorine, or ether groups, thioether groups, ester groups, amide groups, carboxy groups, sulfonic acid groups, carboxylic anhydride groups, carbonyl groups, or hydroxyl groups.

The polyhydroxy compounds claimed may have been esterified at any hydroxyl group, and therefore use may be made of the di-, tri- or polyesters as well as of the monoesters. However, it is preferable to use the mono-, di- or triesters.

To improve water-solubility, the carboxylic esters claimed may contain polyethylene oxide units as spacers between carboxylic acid component and alcohol component. The number of polyethylene oxide units is generally from 1 to 80, preferably from 2 to 40.

If solubility in water is sufficient, it is preferable for the polyhydroxy carboxylic esters to be added in pure form to the emulsion polymer. Otherwise, the carboxylic esters are added in emulsified form. For the emulsification it is preferable to use the protective colloids listed further below, where appropriate combined with suitable emulsifiers. Emulsifiers used here may be either anionic, cationic, or nonionic emulsifiers.

It is also preferable for the carboxylic esters to be added to the aqueous phase of the emulsion polymerization. The carboxylic esters claimed may also be used as a feed during the emulsion polymerization.

In another embodiment, the carboxylic esters are applied to a solid carrier, as described in detail in DE-A-195 35 833 and DE-A-197 52 659. These carriers are the anticaking agents listed below, and also magnesium hydrosilicates, fine-particle titanium dioxide, aluminas, bleaching earths, activated aluminum oxide, vermiculite, such as bentonite, expanded perlite, and also phosphates, such as Na-phosphate. Particular preference is given to silicas with a BET surface area of at least 50 m$^2$/g, in particular at least 100 m$^2$/g. The amount of carboxylic ester added is from 10 to 160% by weight, based on the weight of the carrier material used.

These coated products are either used as anticaking agents and admixed during the atomization process, or are added directly to the finished dispersion powder.

In one preferred embodiment, the dispersion powder composition comprises from 3 to 30% by weight, preferably from 3 to 15% by weight, of protective colloid, based on the total amount of water-insoluble polymer. Examples of suitable protective colloids are polyvinyl alcohols and derivatives of these, such as vinyl alcohol-vinyl acetate copolymers, polyvinyl alcohol-ethene copolymers, polyvinylpyrrolidones, polysaccharides, such as starches (amylose and amylopectin), cellulose, guar, tragacantic acid, dextran, alginates, and carboxymethyl, methyl, hydroxyethyl, or hydroxypropyl derivatives, proteins, such as casein, soya protein, gelatin, synthetic polymers, such as poly(meth)acrylic acid, poly(meth)acrylamide, polyvinylsulfonic acids, and water-soluble copolymers of these, melamine-formaldehydesulfonate, naphthaline-formaldehydesulfonate, styrene-maleic acid copolymers and vinyl ether-maleic acid copolymers.

Preferred suitable anticaking agents are aluminum silicates, calcium carbonates and magnesium carbonates and mixtures of these, silicas, and combinations of dolomite and, respectively, calcite and talc. The particle size of the anticaking agents is preferably from 0.001 to 0.5 mm.

The dispersion powder composition is preferably prepared by spray drying. This drying takes place in conventional spray drying systems, using atomization by means of single-, twin-, or multiple-fluid nozzles or by a rotating disk. The discharge temperature selected is generally in the range from 50 to 100° C., preferably from 60 to 90° C., depending on the system, the glass transition temperature of the polymer, and the desired degree of drying. To increase the storage stability and flowability of the dispersion powder it is preferable to introduce an anticaking agent into the spray tower in parallel with the dispersion, the result being the preferred deposition of the anticaking agent onto the dispersion particles.

The dispersion powder composition may be used in the typical application sectors, for example in construction chemistry products in combination with inorganic, hydraulically setting binders, such as cements (Portland, alumina, pozzolanic, slag, magnesia, or phosphate cement), gypsum plaster, waterglass, for producing construction adhesives, renders, troweling compounds, floor-filling compositions, jointing mortars, or paints, or else as sole binders for coating compositions or adhesive compositions, or as binder for textiles. The dispersion powder composition is preferably used as a hydrophobicizing binder in application sectors where, besides good adhesion, reduced water absorption and/or a water-repellent effect is desirable.

EXAMPLES

The parts and percentages stated in the examples are based on weight unless otherwise stated.

Examples 1 to 6

1 300 parts of a polyvinyl-alcohol-stabilized dispersion based on vinyl acetate, vinyl 10-versatate, and butyl acrylate (45:45:10), solids content: 54.1%;

viscosity (Haake VT 500, 386.6 s$^{-1}$): 1 150 mPa.s;

T$_g$: 13° C., measured by differential scanning calorimetry (DSC) using a heating rate of 10 K/min;

particle size distribution: d$_w$: 1 863 nm, d$_w$/d$_n$: 12.8;

were treated with 140 parts of a 25% strength polyvinyl alcohol solution (viscosity of the 4% strength aqueous solution at 20° C.: 4 mPa.s, degree of hydrolysis: 88%, degree of polymerization: 630).

Three parts of the following hydrophobicizing agents were added, respectively, to the mixture:

| Example No. | Hydrophobicizing agent |
| --- | --- |
| 1 (comparison) | Sorbitan monolaurate |
| 2 | Glycerol monolaurate |
| 3 | Glycerol monostearate |
| 4 | Triglycerol diisostearate |
| 5 | Diglycerol diisostearate |
| 6 | Glycerol triacetoxystearate |

The mixtures were diluted with deionized water to 40% solids content and spray-dried with addition of an anticaking mixture of talc and dolomite (spray drier from Niro, inlet temperature: 130° C., discharge temperature: 65° C., throughput: 1 kg of dispersion/hour). The content of anticaking agent is 15%.

The dispersion powders 1 to 6 isolated were used in hydraulically setting compositions, and water absorption values were determined as follows:

A pulverulent mineral topcoat render was first prepared from 300 parts of CEM I 42.5 R (white) Portland cement
2 parts of ®Tylose MH 10007 P4
240 parts of powdered limestone <0.1 mm
780 parts of calcareous sandstone from 0.1 to 0.7 mm
598 parts of calcareous sandstone from 0.7 to 1.25 mm
60 parts of slaked lime
20 parts of dispersion powder.

The constituents of the mineral topcoat render were homogenized in a Lödige (M5R) mixer for 3 minutes at scale setting 8.5. 200 parts of the pulverulent mineral topcoat render were stirred at a high rotation rate for 15 seconds after addition of 48 parts of water in a Lenart stirrer (Vollrath, EWTHV-1). The composition was allowed to age for 5 minutes, and was then stirred again manually.

A template of dimensions 0.5×10×20 cm was placed on top of a sheet of EPS (expanded polystyrene) of thickness 2 cm. This was uniformly filled with the composition, which was smoothed.

The system was allowed to stand overnight, and the test specimens were then cut out, and the edge was sealed off with molten paraffin.

The sealed-off test specimens were first stored for 3 days at a temperature of 23° C. in a water-vapor-saturated atmosphere, and then stored for 3 days at 50% relative humidity.

The test specimens were then weighed, and were then placed with the test surface downward in a water-filled basin. After 4 and, respectively, 24 h, the test specimens were taken out, dabbed dry with a sponge wiper, and weighed. The increase in weight was converted to $g/m^2$.

The water absorptions of the topcoat renders formulated using dispersion powders 1 to 6 are given in the table below:

| Example No. | Water absorption 4 h ($g/m^2$) | Water absorption 24 h ($g/m^2$) |
|---|---|---|
| 1 (comparison) | 875 | 1020 |
| 2 | 255 | 380 |
| 3 | 845 | 975 |
| 4 | 355 | 505 |
| 5 | 445 | 620 |
| 6 | 535 | 645 |

What is claimed is:

1. A dispersion powder composition consisting essentially of water-insoluble polymers and based on the total weight of the polymer, an amount in the range from 0.1 to 30% by weight of at least one carboxylic ester whose acid component has at least 6 carbon atoms and whose alcohol component is a polyhydroxy compound wherein the polymer comprises, based on the total weight of the polymer, from 0 to 30% by weight of anticaking agents.

2. The dispersion powder composition as claimed in claim 1, wherein the alcohol component has been selected from the group of glycerol, diglycerol, and triglycerol.

3. The dispersion powder composition as claimed in claim 1, which comprises at least one water-insoluble polymer selected from the group consisting of
   the vinyl-ester homo- and copolymers, vinyl ester-ethylene homo- and copolymers, vinyl ester -(meth)acrylate homo- and copolymers, vinyl ester-(meth)acrylate-ethylene homo- and copolymers,
   the (meth)acrylate homo- and copolymers, styrene-(meth)acrylate homo- and copolymers,
   homo- and copolymers of fumaric or maleic esters,
   the homo- and copolymers of vinyl halides, vinylaromatics, dienes, olefins, and of the polyurethanes, polyesters, polyethers, polyamides, melamine-formaldehyde resins, phenol-formaldehyde resins, or of their oligomeric precursors.

4. The dispersion powder composition as claimed in claim 1, wherein the polymer is stabilized by means of protective colloids and/or emulsifiers.

5. The dispersion powder composition as claimed in claim 1, wherein the polymer comprises, based on the total weight of the polymer, from 3 to 35% of a protective colloid.

6. The dispersion powder composition as claimed in claim 1, which comprises
   a) at least one water-insoluble polymer selected from the group consisting of the vinyl ester homo- and copolymers, vinyl ester-ethylene homo- and copolymers, vinyl chloride homo- and copolymers, (meth)acrylate homo- and copolymers, styrene-(meth)acrylate homo- and copolyrners;
   b) from 3 to 35% by weight, based on the total weight of the polymer, of a protective colloid;
   c) from 0.1 to 30% by weight, based on the total weight of the polymer, of at least one carboxylic ester whose acid component has at least 6 carbon atom and whose alcohol component is glycerol, diglycerol, or triglycerol, and which has between 0 and 80 polyethylene oxide units between acid component and alcohol component;
   d) from 0 to 30% by weight, based on the total weight of the polymer, of anticaking agents.

7. The dispersion powder composition as claimed in claim 1, wherein polyvinyl alcohol with a degree of polymerization of from 200 to 3,500 and a degree of hydrolysis of from 80 to 98 mol % is used as protective colloid for preparing the polymer.

8. The dispersion powder composition as claimed in claim 1, wherein the acid component contains halogens, hydroxyl groups, ether groups, thioether groups, ester groups, amide groups, carboxy groups, sulfonic acid groups, carboxylic anhydride groups, and/or carbonyl groups.

9. The dispersion powder composition as claimed in claim 1, wherein the carboxylic esters used comprise the corresponding mono-, di-, or triesters of glycerol, of diglycerol, or of triglycerol.

10. The dispersion powder composition as claimed in claim 1, wherein aluminum silicate, calcium carbonate or magnesium carbonate or mixtures of these, silicas, or combinations of dolomite and, respectively, calcite and talc are used as anticaking agents.

11. The dispersion powder composition as claimed in claim 1, wherein the carboxylic acid has been applied to a pulverulent carrier material, and the carrier material comprises an amount in the range of from 10 to 160% by weight of carboxylic ester, based on the total weight of the carrier material.

12. The dispersion powder composition as claimed in claim 11, wherein the pulverulent carrier material is an anticaking agent selected from the group consisting of aluminum silicate, calcium carbonate or magnesium carbonate or mixtures of these, silicas, or combinations of dolomite and calcite and talc.

13. The dispersion powder composition as claimed in claim 11, wherein the carrier material is fumed silica or precipitated silica with a BET surface area of at least 50 $m^2/g$.

14. A process for preparing a dispersion powder composition as claimed in claim 1, in which polymer a), a protective colloid b), and carboxylic esters c), and, if desired, further protective colloid b) are mixed to prepare a dispersion and this is then, where appropriate, dried with simultaneous admixing of the anticaking agent d).

15. The process as claimed in claim 14, wherein the carboxylic ester is added to the initial charge of the polymer a) needed for the preparation process.

16. The process as claimed in claim 15, wherein the carboxylic ester is applied to a carrier material and this coated material is added during and/or after the drying of the dispersion powder composition.

17. The process as claimed in claim 16, wherein the coated material is added after the drying of the dispersion powder composition.

18. The process as claimed in claim 14, wherein drying takes place by spray drying in a drying tower.

19. A process for modifying wallpaper pastes, mortar, or concrete by addition of a dispersion powder composition as claimed in claim 1.

* * * * *